US010230969B2

(12) United States Patent
Swaminathan et al.

(10) Patent No.: US 10,230,969 B2
(45) Date of Patent: Mar. 12, 2019

(54) LOW-LATENCY VECTOR QUANTIZATION FOR DATA COMPRESSION

(71) Applicant: Adobe Systems Incorporated, San Jose, CA (US)

(72) Inventors: Viswanathan Swaminathan, Saratoga, CA (US); Saayan Mitra, San Jose, CA (US); Haoliang Wang, Fairfax, VA (US)

(73) Assignee: Adobe Systems Incorporated, San Jose, CA (US)

( * ) Notice: Subject to any disclaimer, the term of this patent is extended or adjusted under 35 U.S.C. 154(b) by 30 days.

(21) Appl. No.: 15/658,282

(22) Filed: Jul. 24, 2017

(65) Prior Publication Data

US 2019/0028723 A1    Jan. 24, 2019

(51) Int. Cl.
*H04N 19/42*    (2014.01)
*H04N 19/94*    (2014.01)
*H04N 21/4147*    (2011.01)

(52) U.S. Cl.
CPC ............ *H04N 19/42* (2014.11); *H04N 19/94* (2014.11); *H04N 21/4147* (2013.01)

(58) Field of Classification Search
CPC ..... H04N 19/42; H04N 19/94; H04N 21/4147
See application file for complete search history.

(56) References Cited

U.S. PATENT DOCUMENTS 9,054,876 B1 * 6/2015 Yagnik ............... H04L 9/3236
9,277,234 B1 * 3/2016 Whillock ............ H04N 19/44

OTHER PUBLICATIONS

U.S. Appl. No. 15/658,327, filed Jul. 24, 2017, Titled: *Optimization of a Media Processing System Based on Latency Performance.*
Arya, Sunil and David M. Mount, "Algorithms for Fast Vector Quantization," *Proc. Data Compression Conference*, J. A. Storer and M. Cohn, eds., Snowbird, Utah (1993), IEEE Computer Society Press, pp. 381-390.
Linde et al, "An Algorithm for Vector Quantizer Design," *IEEE Transactions on Communications*, 28 (1980), pp. 84-95.
Pan et al., "Fast clustering algorithms for vector quantization," *Pattern Recognition*, vol. 29, Issue 3 (Mar. 1996), pp. 511-518.
Somervuo, Panu and Teuvo Kohonen, "Self-Organizing Maps and Learning Vector Quantization for Feature Sequences," *Neural Processing Letters*, vol. 10, Issue 2 (Oct. 1999), pp. 151-159.

(Continued)

*Primary Examiner* — Huy T Nguyen
(74) *Attorney, Agent, or Firm* — Kilpatrick Townsend & Stockton LLP

(57) ABSTRACT

Various embodiments describe data compression that implements vector quantization. A computer system generates a codebook for the vector quantization by iteratively clustering vectors representative of data that should be compressed. The iterative clustering uses geometric reasoning to avoid distance computations between vectors as appropriate, thereby reducing the latency associated with generating the codebook. Further, the system encodes the vectors based on the codebook. To do so, the computer system generates hashes of the vectors by applying locality sensitive hashing to these vectors. The hashes are compared and matched with hashes of codebook vectors. The computer system represents the vectors based on the matched codebook vectors.

20 Claims, 9 Drawing Sheets

(56) References Cited

OTHER PUBLICATIONS

Song, Byung Cheol and Jong Beom Ra, "A Fast Search Algorithm for Vector Quantization using L/sub 2/-norm Pyramid of Codewords," *IEEE Transactions on Image Processing*, vol. 11, Issue: 1 (Jan. 2002), pp. 10-15.

\* cited by examiner

LOW-LATENCY VECTOR QUANTIZATION FOR DATA COMPRESSION

TECHNICAL FIELD

The application generally relates to data compression. In an example, vector quantization is used for the data compression. The vector quantization uses geometric reasoning and locality-sensitive hashing to reduce the latency associated with the data compression.

BACKGROUND

A user operates a computing device to access media data (e.g., electronic content) from a media source. The media data can include audio data, video data, and/or other multimedia data. In many situations, the original format of the media data uses a relatively large data storage space. To reduce the data size and save data storage space, data compression is used. For example, the media source compresses the media data from the original format and provides the compressed media data to the computing device. The computing device decompresses the compressed media data for presentation to the user.

Many data compression techniques are possible. Vector quantization is one example of such techniques. In this technique, original media data, which is represented with media vectors from a large vector space, is encoded into codebook vectors in a subspace of the larger vector space. To do so, vector quantization uses a codebook to encode the representative media vectors into codebook vectors in the subspace. Because the subspace of the codebook vectors is smaller than the space of the media vectors, the encoded media data occupies less space in storage, requires less bandwidth in transmission, etc.

Although the data size is reduced, data compression generally involves complex computations that increase latency when the data is accessed, thereby reducing how quickly the data can be accessed and presented to a user. For example, in vector quantization, distances between the media vectors and the codebook vectors are computed using time-consuming algebraic functions. Hence, a time delay exists between a request to access the media vectors and the presentation of the media data represented by the codebook vectors. This time delay increases as the number and complexity of the decoding computations increase.

Practically, the latency associated with encoded data degrades the user's experience associated with the access to the media. For example, a digital video recorder (DVR) may use a particular data compression technique that introduces a ten-second latency. Based on a user request to record a live video stream at a particular time, the live video stream is compressed into a video file and the video file is stored for playback. However, the latency performance delays the availability of the recorded video stream for a particular time period (e.g., up to ten seconds). Hence, the live video stream may only be available for playback after that time period (e.g., ten seconds) and is similarly delayed from thereon.

SUMMARY

Embodiments of the present disclosure describe data compression that implements vector quantization, where latency of the data compression is reduced by avoiding unnecessary complex computations. In an example, a computer system generates a codebook for the vector quantization by iteratively clustering media vectors representative of media data that should be compressed, such as already compressed video data. The codebook includes codebook vectors, where each codebook vector corresponds to a centroid of one of the clusters. The iterative clustering includes computing a displacement of a first centroid of a first cluster between successive clustering iterations. The iterative clustering also includes computing an upper bound on the displacement of the first centroid relative to a first media vector clustered in the first cluster. The iterative clustering further includes comparing the upper bound to a lower bound on a displacement of a second centroid of a second cluster relative to the first media vector. In addition, the iterative clustering includes generating, based on a rule, a decision about whether the first media vector should remain in the first cluster. The rule specifies that the first media vector should remain in the first cluster based on a determination that the upper bound is smaller than the lower bound. In this way, the second clustering iteration avoids computing the distances between the first vector and each of the locations of the first centroid and the second centroid in the second clustering iteration. By using such displacement information and rule, the iterative clustering eliminates unnecessary computations of distances, where such computations are complex and time-consuming. Hence, the latency associated with generating the codebook is significantly reduced.

The computer system also generates a hash for the first media vector based on locality-sensitive hashing. By using locality-sensitive hashing, the hash is common to a second similar media vector. For instance, the two media vectors share the same hash based on the distance proximity between the two media vectors indicating that the two media vectors are similar. Once the hash is generated, the computer system identifies, for the first media vector and from the codebook, an index of a codebook vector. For instance, the computer system compares and matches the hash with hashes of the codebook vectors. The computer system encodes the first media vector by at least representing the first media vector with the index and storing the index in a data storage in lieu of storing the first vector. By using hashes, the encoding eliminates computing distances between the media vectors and the codebook vectors. Hence, the latency associated with generating the encoding is significantly reduced.

These illustrative examples are mentioned not to limit or define the disclosure, but to provide examples to aid understanding thereof. Additional embodiments and examples are discussed in the Detailed Description, and further description is provided there.

DETAILED DESCRIPTION

Figure 1:
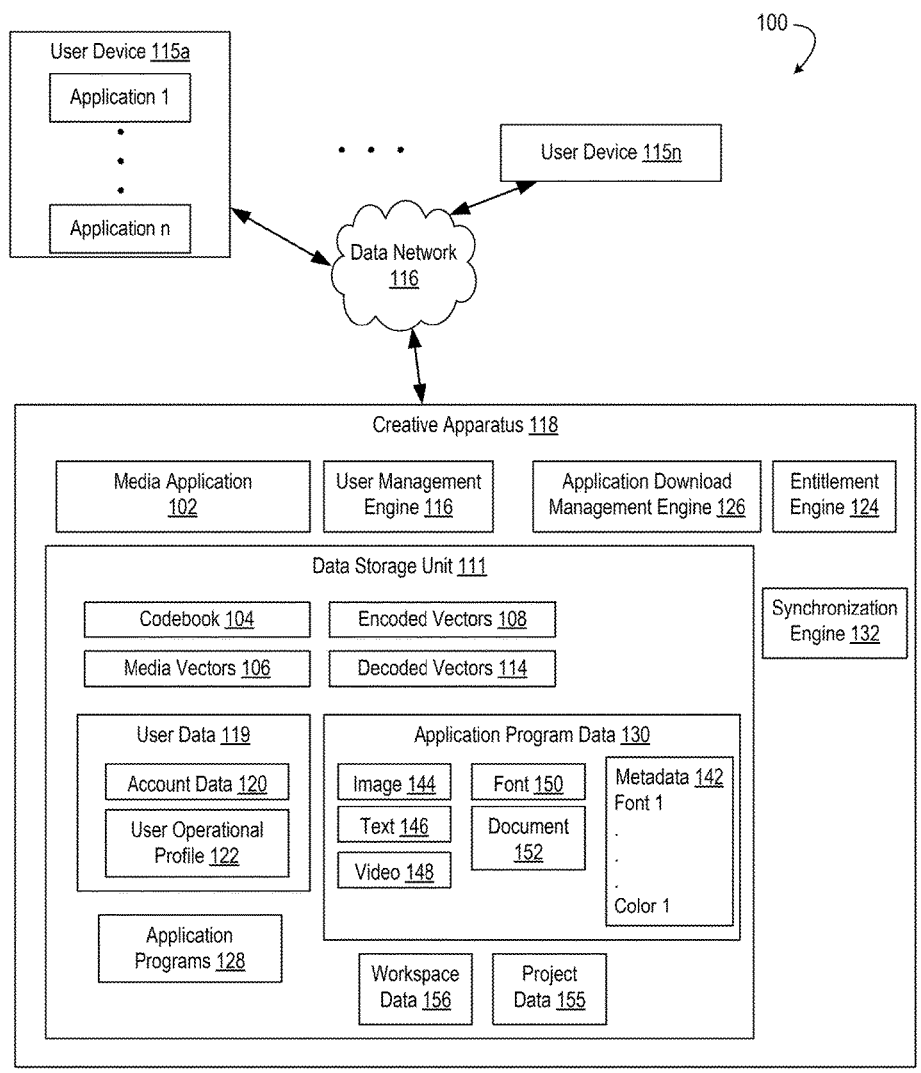
FIG. 1 is a diagram depicting an example of a network environment for implementing a compression process according to certain embodiments.

Embodiments of the present disclosure are directed to, among other things, reducing the latency associated with data compression. The embodiments involve using vector quantization to compress data. As discussed above, existing systems implement vector quantization using complex, time-consuming distance calculation for sets of vectors, thereby contributing to the latency of the vector quantization. In contrast, the embodiments herein avoid performing unnecessary distance computations. In an example, vector quantization generates a codebook by iteratively clustering the vectors and encodes the vectors with indices from the codebook. Rather than using distance computations in each clustering iteration, displacement information about the centroids of the clusters is used. The displacement information indicates whether a distance computation is necessary or not. The unnecessary distance computations are skipped, thereby reducing the latency of the vector quantization. Furthermore, rather than using distance computations in the encoding, hashes of the vectors are used to identify the proper indices from the codebook. Here also, by avoiding the distance computations, the latency of the vector quantization is further reduced. Hence, the overall latency performance is improved because the total number of complex and time-consuming distance computations is reduced.

In an example, a cloud-based computer system supports digital video recording (DVR) functionalities. The system records a live video stream from a source for playback at a client. The live video stream is received from the source over a network in an already compressed format. For instance, the video is already compressed with a moving picture experts group (MPEG) standard format, such as MPEG-4. The compressed format reduces usage of the network bandwidth. Upon receipt of the live video stream, the cloud-based computer system further compresses the already compressed video to save space in storage of the system and use less network bandwidth in the transmission to the client. This additional compression uses vector quantization. To reduce the latency of the vector quantization, displacement information and hashes are used to avoid distance computations as much as possible.

More specifically, vector quantization generates and uses a codebook to encode input vectors (which can also be referred to as media vectors for a multimedia stream) into a compressed format and to decode the input vectors from the compressed format. The input vectors represent the already compressed video received by the cloud-based computer system (e.g., the MPEG-4 video, or any other media type or compression format). The encoding process of the cloud-based computer system compresses the input vectors and the decoding process cloud-based computer system decompresses the compressed format. The encoding and decoding processes can be collectively referred to as a compression process.

Accordingly, a compression process that uses vector quantization invokes three computation modules: a trainer that generates a codebook, an encoder that encodes input vectors, and a decoder that decodes the encoded input vectors. Each of these modules introduces latency to the compression process. Relative to the trainer and encoder, the decoder has the smallest latency contribution. Hence, the overall latency performance of the compression process can be significantly improved by reducing the latencies of the trainer and encoder. To do so, the trainer implements geometric reasoning and the encoder implements locality-sensitive hashing in some embodiments of the present disclosure.

The next paragraphs explain first how the trainer generates the codebook, then how the encoder encodes the input vectors, and finally how the decoder decodes the vectors. The compression process of existing systems is then summarized to help with an understanding of the benefits derived from the embodiments of the present disclosure.

The codebook for vector quantization is generated by iteratively clustering the input vectors into clusters. The centroid of each cluster is used to represent the input vectors clustered in that cluster. The centroids (also referred to herein as codebook vectors) and indices of the centroids form the codebook. In an example, for "M" input vectors, the codebook includes "K" centroids and "K" indices (where "M" and "K" are integers and "M" is greater than "K").

In some embodiments of the present disclosure, the trainer implements geometric reasoning. The geometric reasoning involves using displacement information of the centroids at each iteration to eliminate some unnecessary distance computations. More specifically, the trainer computes displacements of the centroids between the clustering iterations instead of computing the distances of the input vectors to the displaced centroids. Although the displacement is a distance, the total number of computed displacements is at most "K" (the total number of centroids). Thereafter, the trainer uses the displacements to assess whether any re-clustering is needed. Only if some re-clustering is needed, the distances between the relevant vectors and the relevant displaced centroids are computed. Hence, the total number of distance computations is significantly reduced, which alleviates the processing burden and reduces the latency of the iterative clustering and, equivalently, of the trainer.

To illustrate, in an iteration, a particular input vector is clustered in a first cluster having a first centroid. In the next iteration, if the displacements of the centroids indicate that no centroid moved potentially closer to the input vector given the displacement of the first centroid, the trainer maintains the input vector in the first cluster. No additional distance computation is performed for the input vector. On the other hand, if a second centroid moved potentially closer, the trainer may compute and compare the distances between the input vector and each of the first and second centroids. The input vector stays in the first cluster if the distance to the first centroid is the smallest of the two distances. Otherwise, the trainer moves the input vector to a second cluster represented by the second centroid.

To encode the input vectors, the encoder uses the codebook. For example, the encoder matches the input vectors to the codebook vectors and represents the input vectors with the indices based on the matches. The indices are stored in data storage in lieu of the input vectors. Because the indices are values that point to the codebook vectors, the stored indices establish a compressed format of the input vectors.

In some embodiments of the present disclosure, the encoder implements locality-sensitive hashing. The locality-sensitive hashing applies a hashing function to the input vectors such that similar input vectors may have a same hash. Generally, the larger the number of common values is across the elements of two vectors, the more similar the two vectors are and the more likely that the two vectors have a same hash. Hence, the encoder generates a hash for each input vector, where the hash of an input vector is a value that is likely common with at least one other input vector given the similarities between the vectors. The encoder compares and matches hashes of the input vectors with hashes of the codebook vectors. Each comparison is a value-to-value comparison instead of a distance computation between two vectors. Closest value matching can be used. Hence, the encoder no longer uses distance computations, thereby alleviating the processing burden and reducing the latency of the encoding.

To illustrate, each input vector and codebook vector includes "N" elements (where "N" is an integer, such as "16," "64" or "256"). Two input vectors share the same values for "N-1" elements and differ by only one element. Accordingly, the hash of these two input vectors is the same. Upon matching the hash with a hash of a codebook vector, the two input vectors are encoded to the same index of that codebook vector.

The decoder is relatively fast because it does not use distance computations. The decoding involves accessing the stored indices and looking up the codebook vectors from the codebook given the indices. In lossy data compression, the codebook vectors are the output and include some differences relative to the input vectors. In lossless data compression, the decoder also corrects for the differences. This correction can rely on error information passed from the encoder to the decoder.

In existing systems, the trainer uses iterative clustering, where the distances between the input vectors and the centroids are computed and compared in each iteration. The input vectors are re-clustered to minimize the distances. The number of distance computations is large. Further, each distance computation is complex. Hence, such trainer consume much larger time and levy a heavier processing burden relative to the embodiments of the present disclosure.

In also existing systems, the encoder matches the vectors by computing the distances between the input vectors and the codebook vectors. An input vector is matched to a codebook vector if the distance between the two is the smallest among the distances between the input vector and all of the codebook vectors. The number of distance computations is large and each distance computation is complex. Hence, such encoders also consume much larger time and levy a heavier processing burden relative to the embodiments of the present disclosure.

In the interest of clarity of explanation, various embodiments of the present disclosure are described in connection with compressing and decompressing media data available from a media stream. However, the embodiments are not limited as such. The embodiments also apply to stored media data. Likewise, the embodiments apply to the compression and decompression of any type of data. Generally, the embodiments involve vector quantization that operates on vectors representative of data. Geometric reasoning is applied for clustering the vectors in clusters and generating a codebook that includes the centroids of such clusters. Locality-sensitive hashing is applied for creating hashes that are used along with the codebook to encode the vectors.

FIG. 1 is a diagram depicting an example of a network environment 100 for implementing a compression process according to certain embodiments. In the example depicted in FIG. 1, a media application 102 uses a compression process that involves vector quantization. For example, the media application 102 implements a trainer configured to generate a codebook 104 based on media vectors 106, an encoder configured to generate encoded vectors 108 by encoding the media vectors 106 based on the codebook 108, and a decoder configured to generate decoded vectors 114 by decoding the encoded media vectors 108. Examples of operations performed by the trainer, encoder, and decoder are further described in connection with the next figures. In some embodiments, the media application 102 is executed by a creative apparatus 118 using data stored on a data storage unit 111 (e.g., one or more of the codebook 104, the media vectors 106, the encoded vectors 108, and the decoded vectors 114). In additional or alternative embodiments, the media application 102 is executed by another device, such as a user device 115a, using data stored on the data storage unit 111 (e or data stored on another non-transitory computer-readable medium (e.g., a non-transitory computer-readable medium storing one or more of the codebook 104, the media vectors 106, the encoded vectors 108, and the decoded vectors 114).

In some embodiments, the environment 100 includes user devices, such as user devices 115a-n. Each of the user devices is connected to either the creative apparatus 118 or a marketing apparatus, or both, via a network 116. A user of the user devices uses various products, applications, or services supported by the creative apparatus 118 via the network 116.

The user devices 115a-n correspond to various users. Examples of the users include, but are not limited to, creative professionals or hobbyists who use creative tools to generate, edit, track, or manage creative content, marketing professionals who use marketing tools to generate, edit, track, or manage online content, or to manage online marking processes, end users, administrators, users who use image tools to create, edit, track, or manage images, advertisers, publishers, developers, content owners, content managers, content creators, content viewers, content consumers, designers, editors, any combination of these users, or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming, or performing any other function or workflow related to content. Digital tools include the creative apparatus 118. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer, tablet computer, a desktop computer, a processing unit, any combination of these devices, or any other suitable device having one or more processors. Each user device includes at least one application supported by the creative apparatus 118. It is to be appreciated that the following description is now explained using the user device 115a as an example and any other user device can be used. Examples of the network 116 include, but are not limited to, internet, local area network ("LAN"), wireless area network, wired area network, wide area network, and the like.

The creative apparatus 118 includes one or more engines for providing one or more digital experiences to the user. In some embodiments, these engines include one or more of the engines depicted in FIG. 1. In other embodiments, one or more of the engines depicted in FIG. 1 may be omitted from a creative apparatus 118.

The creative apparatus 118 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 118 also includes a data storage unit 111. The data storage unit 111 can be implemented as one or more databases or one or more data servers. The data storage unit 111 includes data that is used by the engines of the creative apparatus 118.

In some embodiments, a user of the user device 115a visits a webpage or an application store to explore applications supported by the creative apparatus 118 (e.g., the media application 102). The creative apparatus 118 provides the applications (e.g., the media application 102) as a software as a service ("SaaS"), or as a standalone application that can be installed on the user device 115a, or as a combination.

In some embodiments, the user creates an account with the creative apparatus 118 by providing user details and by creating login details. Alternatively, the creative apparatus 118 can automatically create login details for the user in response to receipt of the user details. In some aspects, the user is also prompted to install an application manager. The application manager enables the user to manage installation of various applications supported by the creative apparatus 118 and to manage other functionalities, such as updates, a subscription account and the like, associated with the applications. The user details are received by a user management engine 116 and stored as user data 119 in the data storage unit 111. In some aspects, the user data 119 further includes account data 120 under which the user details are stored.

In some embodiments, the user either can opt for a trial account or can make payment based on type of account or subscription chosen by the user. Alternatively, the payment can be based on product or number of products chosen by the user. In some embodiments, based on payment details of the user, a user operational profile 122 is generated by an entitlement engine 124. The user operational profile 122 is stored in the data storage unit 111 and indicates entitlement of the user to various products or services. In some embodiments, the user operational profile 122 also indicates type of user, i.e. free, trial, student, discounted, or paid. In some embodiments, the user management engine 116 and the entitlement engine 124 can be one single engine performing the functionalities of both the engines.

In some embodiments, the user installs various applications supported by the creative apparatus 118 via an application download management engine 126. Application installers or application programs 128, which may include a copy of the media application 102 or other software usable with the image to perform operations described herein, are present in the data storage unit 111 and are fetched by the application download management engine 126. These applications are made available to the user directly or via the application manager. In some embodiments, all application programs 128 are fetched and provided to the user via an interface of the application manager. In other embodiments, application programs 128 for which the user is eligible based on user's operational profile are displayed to the user. The user selects the application programs 128 or the applications that the user wants to download. The application programs 128 are downloaded on the user device 115a by the application manager via the application download management engine 126. Corresponding data regarding the download is also updated in the user operational profile 122. An application program 128 is an example of a digital tool. The application download management engine 126 also manages a process of providing updates to the user device 115a.

In some embodiments, upon download, installation, and launching of an application program, the user is asked to provide the login details. A check is again made by the user management engine 116 and the entitlement engine 124 to ensure that the user is entitled to use the application program. In other embodiments, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects or the assets are then stored as application program data 130 in the data storage unit 111 by a synchronization engine 132. The application program data 130 can be specific to the user or can be shared with other users based on rights management.

In some embodiments, the application program data 130 includes one or more assets. The assets can be a shared asset which the user wants to share with other users or which the user wants to offer on a marketplace. The assets can also be shared across multiple application programs 128. In some embodiments, each asset includes metadata 142. Examples of the metadata 142 include, but are not limited to, font, color, size, shape, coordinate, a combination of any of these, and the like.

In some embodiments, each asset also includes a file. Examples of the file include, but are not limited to, an image 144, text 146, a video 148, a font 150, a document 152, a combination of any of these, and the like. In another aspect, an asset only includes the metadata 142. The application program data 130 also include project data 155 and workspace data 156. In some embodiments, the project data 154 includes the assets. In additional or alternative embodiments, the assets are standalone assets. Similarly, the workspace data 156 can be part of the project data 155 in some embodiments and may be standalone data in other embodiments.

In some embodiments, the user can have one or more user devices. The application program data 130 is accessible by the user from any device, including a device that was not used to create the assets. This is achieved by the synchronization engine 132 that stores the application program data 130 in the data storage unit 111 and makes the application program data 130 available for access by the user or other users via any device. Before accessing the application program data 130 by the user from any other device or by any other user, the user or the other user may need to provide login details for authentication if not already logged in. Else, if the user or the other user is logged in then a newly created asset or updates to the application program data 130 are provided in real time. The workspace data 156 enables the synchronization engine 132 to provide same workspace configuration to the user on any other device or to the other user based on rights management data.

Figure 2:
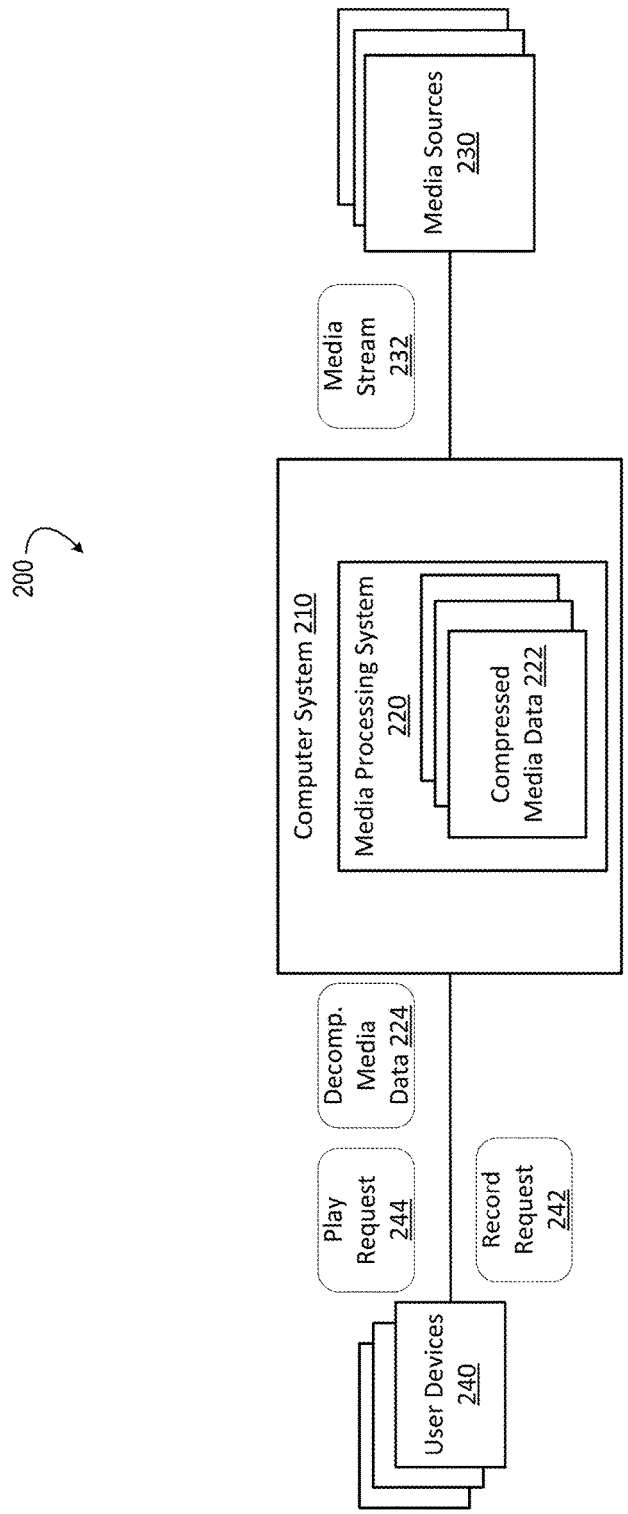
FIG. 2 is a diagram depicting an example of a system for compressing and decompressing media data according to certain embodiments.

FIG. 2 is a diagram depicting an example of a system 200 for compressing and decompressing media data according to certain embodiments. As illustrated, the system 200 includes a computer system 210 that hosts a media processing system 220. The computer system 210 can host some or all components of the creative apparatus 108 of FIG. 1. The media processing system 220 applies a codec to media data available from different media sources 230 and provides access of user devices 240 to the media data. For example, the media processing system 220 hosts the media application 102 of FIG. 1.

In some embodiments, the computer system 210 includes computing resources suitable to host the media processing system 220. For example, the computing resources are dedicated hardware. In another example, the computing resources are virtual machines hosted in a data center and can be set up as a private computing cloud.

Similarly, the media processing system 220 includes computing resources, whether dedicated hardware and/or virtual machines, suitable to implement the compression process. For example, the media processing system 220 hosts a trainer, an encoder, and a decoder. Such configuration is further illustrated in FIG. 3.

In some embodiments, the media sources 230 include computing resources suitable for hosting and providing media data. Some or all these computing resources can be hosted by the computer system 210. If remote from the computer system 210, the media data is provided thereto over a data network. The media data includes audio data, video data, and/or other multimedia data. The media data can have a digital format and can be streamed from the media sources 230 and/or provided on demand. The provided media data, whether streamed or on-demand, can be already compressed. For instance, the media data is compliant with a moving picture experts group (MPEG) standard, such as MPEG-4.

In some embodiments, user devices 240 include computing devices suitable for accessing media data from the computer system 210. For example, the computing devices include mobile devices, tablets, laptops, desktops, personal computers, servers, set-top boxes, or other computing devices that have data connectivity and host one or more applications for requesting and receiving media data from the computer system 210 and presenting the received media data to end users.

In an illustrative example, the system 200 supports digital video recording (DVR) functionalities in an environment of a computing cloud. In this example, the media sources 230 include online servers, content data networks (CDNs), and/or broadcast stations that provide a media stream 232 over various types of data networks. Each of the media sources 230 represents a media channel. The media processing system 220 is implemented as a set of computing resources on the computing cloud.

The computer system 210 continuously receives the media stream 232 across the different media channels. Some or all of the received media data in the stream 232 may already be in a vector format. For example, media data streamed in an MPEG-4 format includes media vectors. If any of the received media data is not in a vector format, the media processing system 220 generates the relevant media vectors based on sampling of the media data. Based on the media vectors, the media processing system 220 uses the trainer to continuously update a codebook for the media received across the media channel to support the compression process.

The computer system 210 receives a record request 242 from one of the user devices 240. The requesting device is associated with a user account. The record request 242 requests the recording of particular media data from one of the media channels for future playback. In turn, the media processing system 220 accesses media vectors that correspond to the requested media data and invokes the encoder to generate and store compressed media data 222 by encoding the media vectors according to the codebook. The compressed media data 222 includes indices from the codebook, where the indices are stored in lieu of the media vectors in data storage on the computing cloud for the user account.

Subsequently, the computer system 210 receives play request 244 from the user device associated with the user account. In an example, the media processing system 220 invokes the decoder to generate decompressed media data 224 by decoding the compressed media data 222 based on the codebook. The decompressed media data 224 is sent to the user device for presentation at a user interface on the user device. In another example, rather than invoking the decoder, the compressed media data 222 itself (e.g., the recorded indices) and the relevant portion of the codebook are sent to the user device. In turn, the user device invokes a decoder and decodes the compressed media data 222 based on the received codebook.

Figure 3:
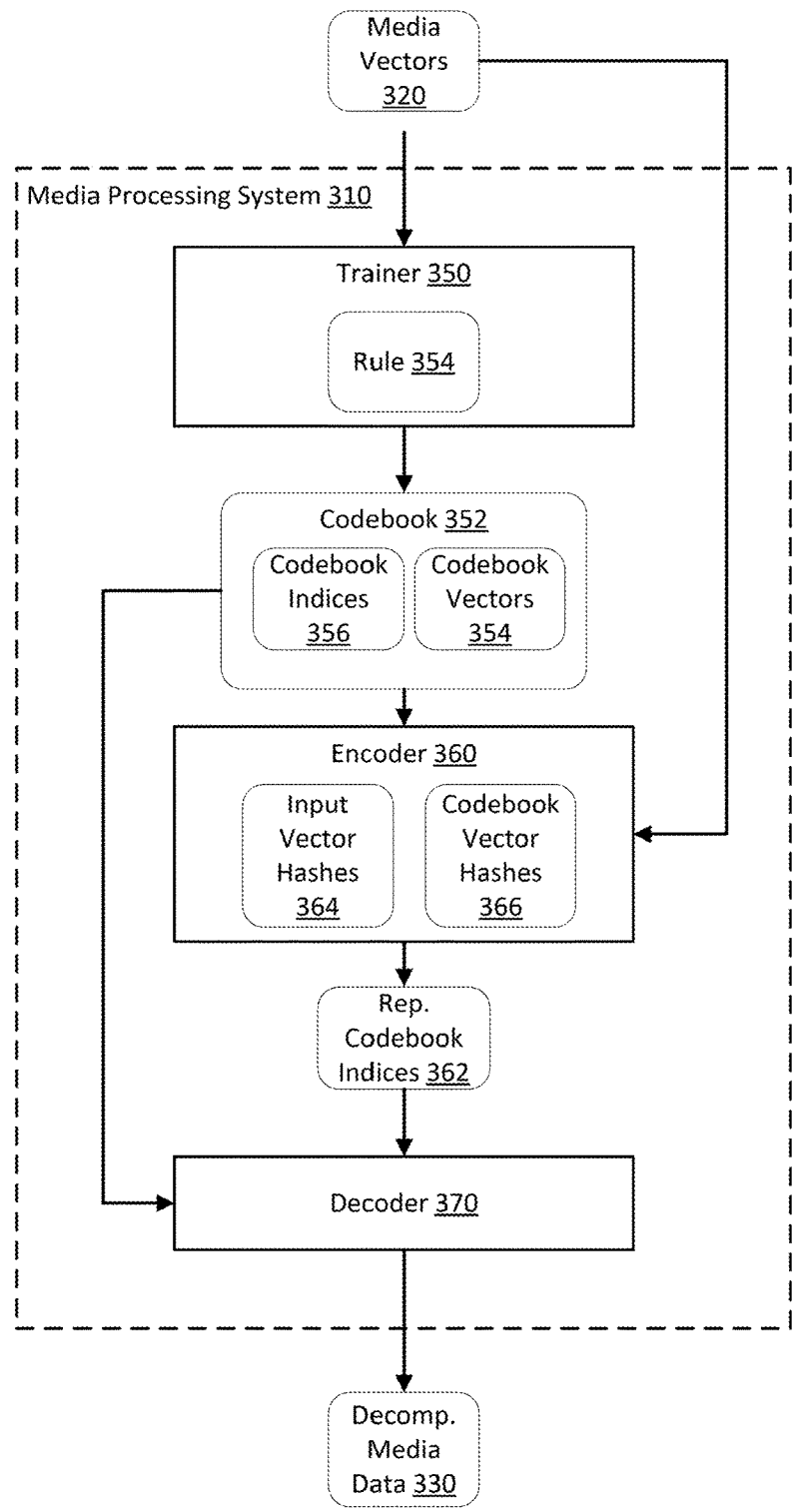
FIG. 3 is a diagram depicting an example of a media processing system according to certain embodiments.

FIG. 3 is a diagram depicting an example of a media processing system 310 according to certain embodiments. As illustrated, the media vectors 320 are input to the media processing system 310. Decompressed media 330 are output from the media processing system 310. The media processing system 310 applies a compression process to the media vectors 320. The compression process generates and stores compressed media data from the media vectors 320 and decompresses the compressed media data to output the decompressed media data 330.

In some embodiments, a media vector is a vector that includes elements, where the values of the elements correspond to values of media data. For example, a video stream is composed of video frames. Each video frame includes a set of pixels. Such a video frame can be represented with a set of video vectors. Each video vector captures a subset of the pixels. If the set of video vectors captures the values of all of the pixels, the vector representation of the video frame is lossless. Otherwise, the vector representation is lossy. MPEG-4 video vectors are an example of a lossy vector representation.

In some embodiments, the media processing system 310 implements a trainer 350, an encoder 360, and a decoder 370 to support the compression process. The trainer 350 accesses the media vectors 320 and generates codebook 352 based on these vectors 320. In an example, the trainer 350 uses geometric reasoning and, optionally, locality-sensitive hashing to avoid, reduce, or even eliminate distance computations between vectors when generating the codebook 352, as further described in FIGS. 5 and 6. Briefly, the trainer 350 computes displacements of centroids between iterations that cluster the media vectors and applies a rule 354 to determine, based on the displacements, whether certain conditions are met or not. These conditions relate to the relative displacements of the centroids to the input vectors 320. The conditions allow the detection of whether a centroid of a cluster that did not previously include an input vector is now potentially closer to the input vector than the centroid of the cluster to which the input vector belonged in the previous iteration. Based on how these conditions are met, unnecessary distance computations are detected and the corresponding distances are not computed. Further, even if a distance computation is necessary, locality-sensitive hashing can be applied to avoid this computation. Hence, the trainer 350 can generate the codebook 352 at a much smaller latency than trainers of existing systems.

The codebook 352 includes codebook vectors 354 and, explicitly or implicitly, indices 356 of the codebook vectors 354. Each codebook vector corresponds to a different centroid of the clusters. The media vectors 320 and the codebook 352 are input to the encoder 360.

Figure 7:
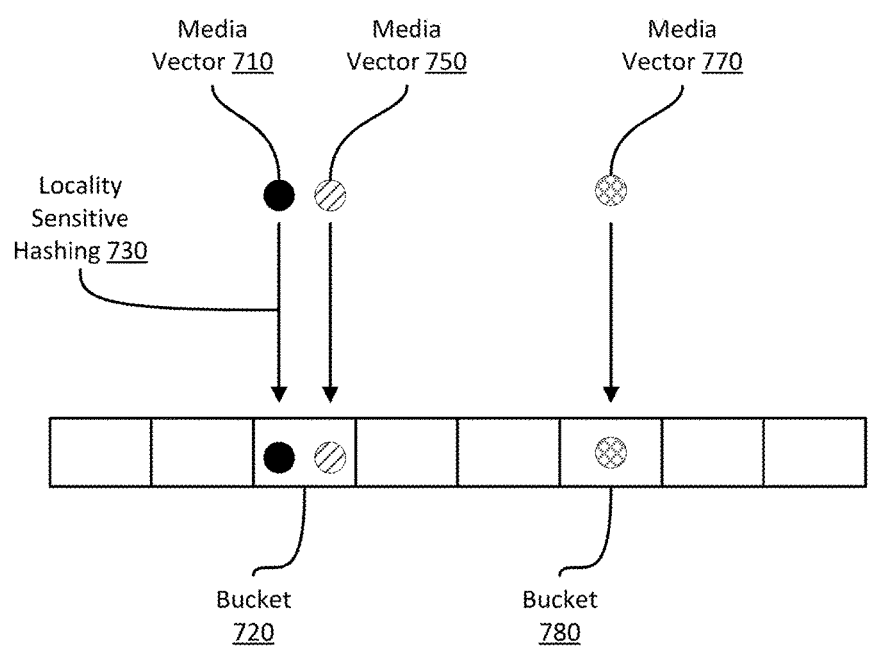
FIG. 7 illustrates an example of locality-sensitive hashing for encoding media vectors according to embodiments of the present disclosure.
Figure 8:
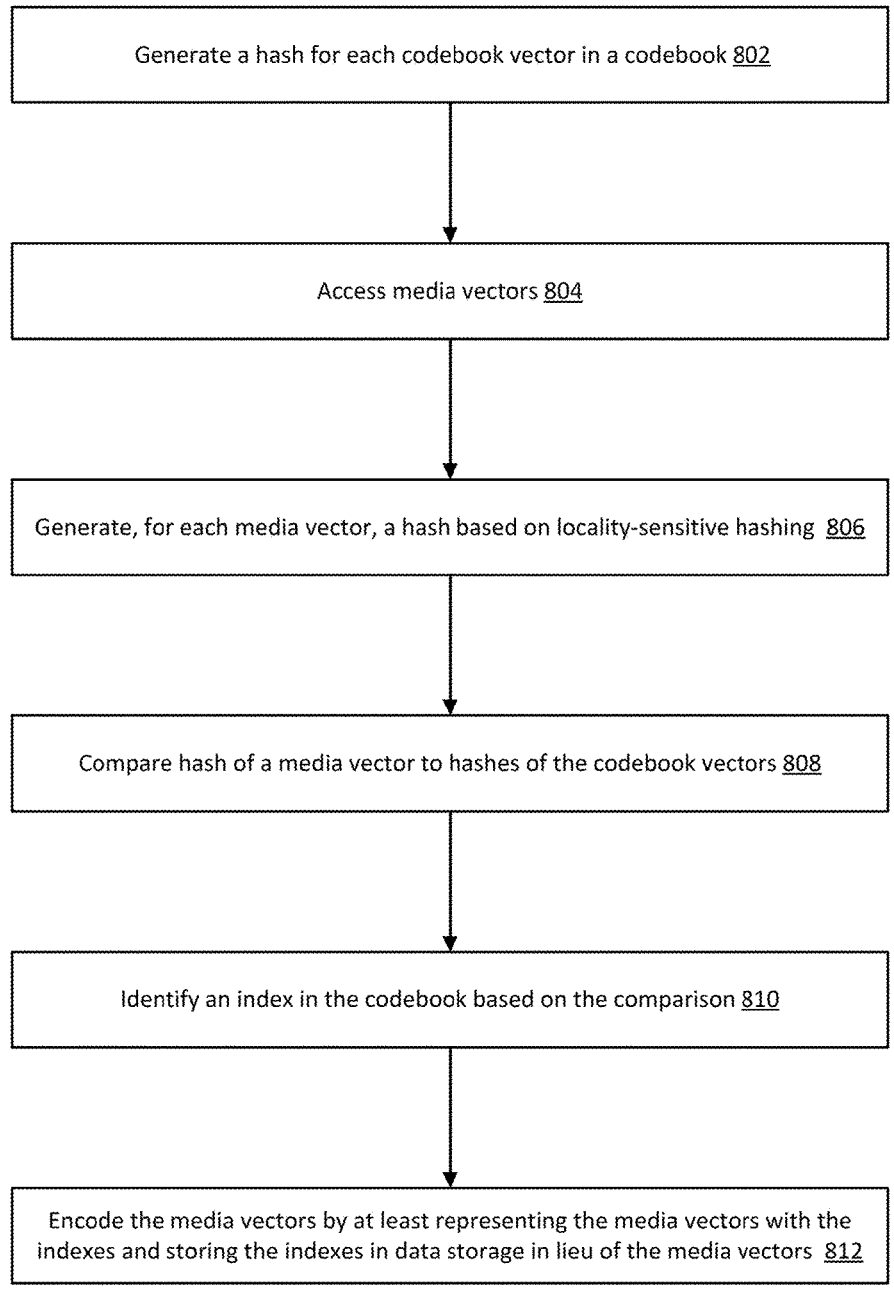
FIG. 8 illustrates an example of a flow for encoding media vectors based on locality-sensitive hashing according to embodiments of the present disclosure.

In an example, the encoder 360 uses locality-sensitive hashing to avoid, reduce, or even eliminate distance computations between the input vectors 320 and the codebook vector 354 as further described in FIGS. 7 and 8. Briefly, the encoder 360 generates hashes 364 of the input vectors 320 by applying locality-sensitive hashing to these vectors 320. The encoder 360 also generates hashes 366 of the codebook vectors. Optionally, the codebook vector hashes 366 are generated by applying locality-sensitive hashing. The encoder 360 compares the input vector hashes 364 to the codebook vector hashes 366 to find matches. The encoder 360 associates an input vector with a particular codebook vector when the hash of that codebook vector is the best match to the hash of the input vector. The input vectors 320 are then encoded based on the associations to the codebook vectors 354. More specifically, an input vector associated with a particular codebook vector is represented by the codebook index of that codebook vector. The encoder 360 outputs the representative codebook indices 362. The representative codebook indices 362 are stored as the compressed media in data storage. Because hashes are used instead of computations of distances between the input vectors 320 and the codebook vectors 354, the encoder 360 can generate the representative codebook indices 362 at a much smaller latency than encoders of existing systems.

The codebook 352 and the representative codebook indices 362 are input to the decoder 370. The decoder 370 uses these indices 362 to identify the relevant codebook vectors from the codebook 352 and outputs the relevant codebook vectors. In lossy vector compression, the decompressed media data 330 includes these codebook vectors. In lossless vector compression, additional processing is performed to account for the differences between the codebook vectors 354 and the media vectors 320. In this case, the decompressed media data 330 includes the media vectors 320.

In some embodiments, the additional processing for lossless compression is distributed between the encoder 360 and the decoder 370 such that error information is passed from the encoder 360 to the decoder 370. The error information allows the decoder 370 to correct the differences between the codebook vectors 354 and the media vectors 320. In an example, when the encoder 360 associates a media vector with a codebook vector, the encoder computes the difference between the two vectors. This difference can be computed as an error vector. Information about that error vector, such as a compression of the error vector, is passed with the index of the codebook vector to the decoder 370. In turn, the decoder 370 uses the information to compute the error vector and the index to identify the codebook vector, and corrects the identified codebook vector based on the error vector to output the media vector.

Figure 4:
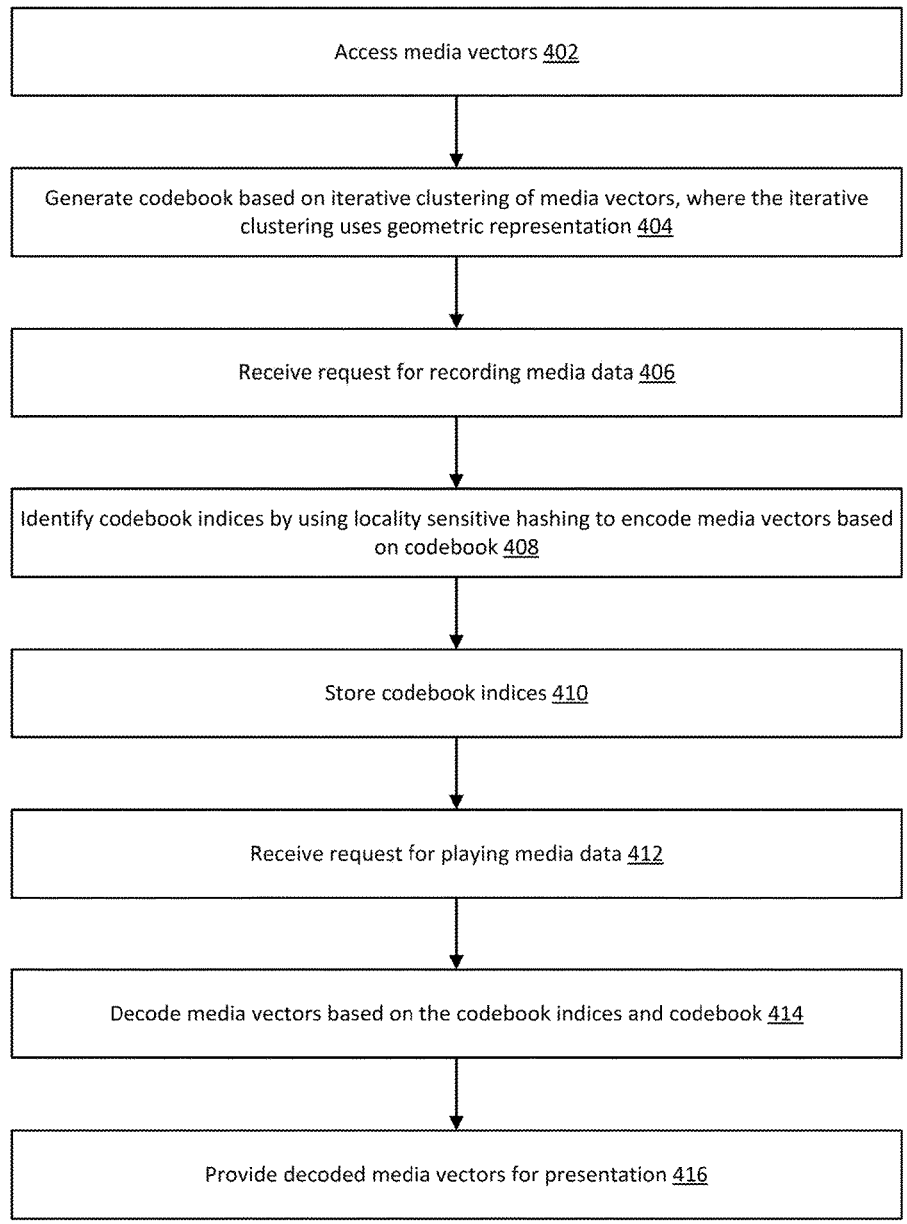
FIG. 4 illustrates an example of a flow for providing media data to user devices according to embodiments of the present disclosure.

FIG. 4 illustrates an example of a flow for providing media data to user devices according to embodiments of the present disclosure. A computer system may be configured to perform the illustrative flow. For example, the computer system can be a component of the creative apparatus 118 of FIG. 1 or can host the media processing system 220 of FIG. 2. The computer system may alternatively be the computing device 110 shown in FIG. 1, in some embodiments. Instructions for performing the operations of the illustrative flow can be stored as computer-readable instructions on a non-transitory computer-readable medium of the computer system. As stored, the instructions represent programmable modules that include code or data executable by a processor of the computer system. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

The example flow of FIG. 4 starts at operation 402, where the computer system accesses media vectors. The media vectors represent media data. The media data can be available form storage accessible to the computer system and/or can be streamed from multiple media sources over a number of media channels. A portion of the media data may include media vectors, such as MPEG-4 media vectors. The computer system samples another portion of the media data to generate corresponding media vectors. In an example, the computer system accesses the media vectors by continuously receiving the media data stream from the media sources and, as necessary, sampling portions of the media data.

At operation 404, the computer system generates a codebook based on iterative clustering of the media vectors. Various clustering techniques are possible. In one example, K-means and KD-tree clustering are used. Further, to reduce the latency associated with generating the codebook, the computer system implements geometric reasoning in the iterative clustering as further described in connection with FIGS. 5 and 6.

At operation 406, the computer system receives a request for recording media data. In an example, the request is received from a user device in communication with the computer system over a data network. The request identifies a user account (and the relevant credentials), the media data, and parameters around the recording (e.g., start time, end time, etc.).

At operation 408, the computer system starts the encoding of the requested media data as part of the recording. More specifically, the computer system identifies codebook indices from the codebook. To do so, the computer system uses locality-sensitive hashing, in an example. For instance, the computer system applies locality-sensitive hashing to the media vectors to generate hashes and matches these hashes with hashes of the codebook as further illustrated in FIGS. 7 and 8. Based on the matches, the computer system identifies, from the codebook, the codebook vectors that are most similar to the media vectors and, accordingly, the computer system represents the media vectors with the identified codebook vectors. The indices of these codebook vectors are then retrieved from the codebook.

At operation 410, the computer system stores the codebook indices. In an example, the codebook indices are stored in a data storage space in lieu of the media vectors. The stored codebook indices represent a compressed format of the media vectors. The storage space can be uniquely associated with the user account. For instance, the storage space is a private virtual space on a computing cloud, where this space is only accessible with the proper credential (e.g., username, password, token, etc.) of the user account.

At operation 412, the computer system receives a request for playing the media data. In an example, the request can be received from the same user device that requested the recording or from a different user device. Either way, the request identifies the user account (and the relevant credentials) and the media data.

At operation 414, the computer system decodes the media vectors based on the stored codebook indices and the codebook. In an example, the computer system accesses the codebook indices from the storage space. These indices are used to look-up the codebook and find the representative codebook vectors. In lossy compression, the computer system outputs these codebook vectors as the decoded media vectors. In lossless compression, the computer system reconstructs the media vectors from the representative codebook vectors based on error information and outputs the reconstructed media vectors as the decoded media vectors.

At operation 416, the computer system provides the decoded media vectors for presentation. In an example, the computer system transmits the decoded media vectors back to the requesting user device. This user device hosts an application that processes the decoded media vectors and presents (e.g. plays in the case of video vectors) the relevant media data at a user interface.

As described in connection with FIG. 2, in some embodiments, the computer system need not decode media vectors and transmit the decoded media vectors to the user device. Instead, this processing is performed on the user device. In this case, the computer system performs the encoding and transmits the stored codebook indices with the relevant portion of the codebook to the user device. In turn, the user device decodes the media vectors based on the stored codebook and indices.

Figure 5:
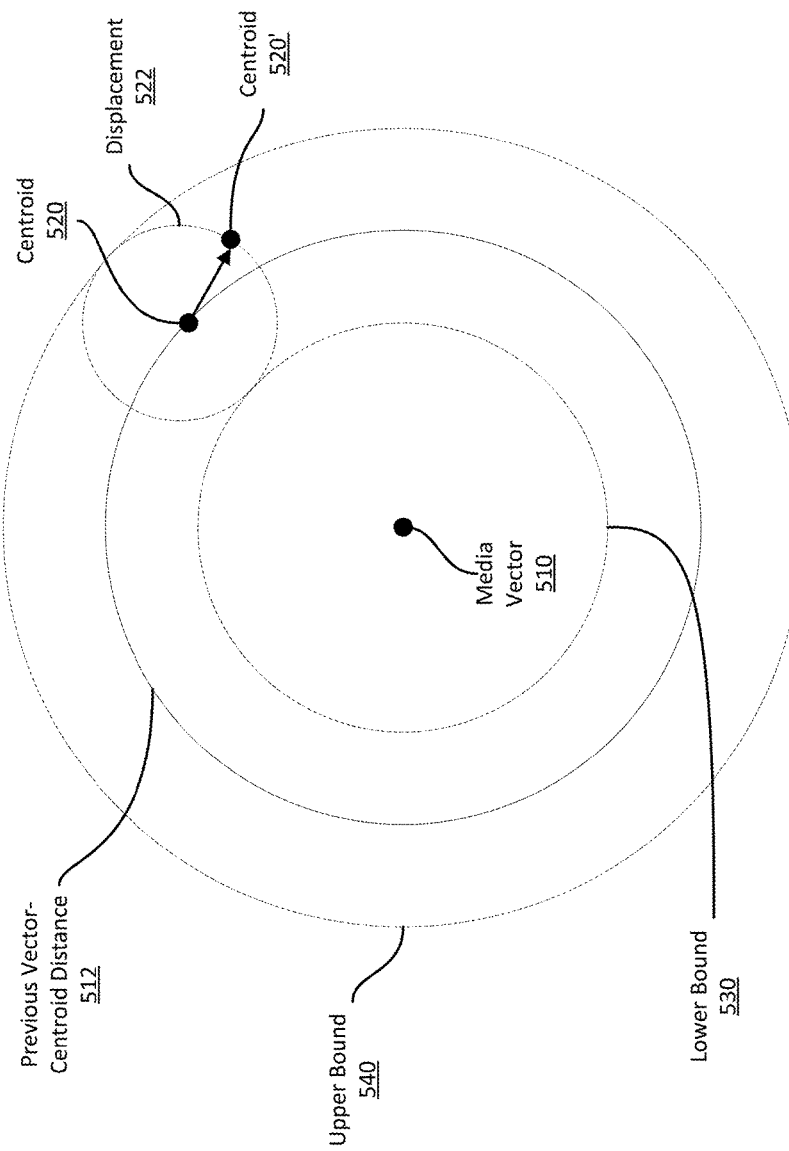
FIG. 5 illustrates an example of geometric reasoning for clustering media vectors and generating a codebook according to embodiments of the present disclosure.

FIG. 5 illustrates an example of geometric reasoning for clustering media vectors and generating a codebook according to embodiments of the present disclosure. Generally, a codebook includes codebook vectors. In some embodiments, these vectors are centroids of clusters, where each cluster groups different media vectors. The clusters are generated based on iterative clustering that uses, for example, K-Means clustering and KD-Tree search.

In K-Means clustering, vectors are clustered in "K" clusters and each cluster is represented by its geometric means (its centroid). This clustering uses an iterative algorithm that proceeds by alternating between an assignment step and an update state. In the assignment step, each vector is assigned to a cluster whose mean yields the least within-cluster sum of squares (WCSS). The WCSS computation include distance computations, such as the computation of Euclidean distances. In the update step, the new means (centroids) of the new clusters are computed. The aim is to minimize the WCSS through the iterations. The algorithm converges when the assignments no longer change (or the change, such as the number of re-assignments, is within an acceptable range).

The KD-Tree search helps by accelerating the K-Means algorithm. KD-Tree is short for k-dimensional binary search tree. Every non-leaf node can be thought of as implicitly generating a splitting hyperplane that divides the space into two parts, known as half-spaces. Points to the left of this hyperplane are represented by the left subtree of that node and points right of the hyperplane are represented by the right subtree. In the K-Means clustering (and, similarly, in the search for matching vectors by an encoder, where the matching would otherwise use distance computations), KD-Tree can be used to accelerate the nearest-neighbor search operation at each iteration by eliminating distance computations through the binary search tree.

Geometric reasoning can be further used in the iterative clustering to eliminate unnecessary distance computations. It can be used in connection with a KD-Tree search or an alternative. Specifically, geometric reasoning allows to identify whether distance computations are needed for a vector that belongs to a cluster or whether the distance computations can be eliminated or skipped because the vector should remain in the cluster and not be potentially re-assigned to another cluster. If the distances computations are needed, these computations may be performed or, alternatively, may be skipped. To skip these otherwise necessary distance computations, the KD-Tree search or locality-sensitive hashing can be used. Locality-sensitive hashing is further described in connection with FIGS. 7 and 8.

As illustrated in FIG. 5, a media vector 510 belongs to a first cluster (not shown) that has a centroid 520 in a previous clustering iteration. In a current clustering iteration, the centroid 520 is displaced (illustrated in FIG. 5 as centroid 520'). If a particular coordinate system is used, the displacement corresponds to the centroid 520 moving from a previous location to a new location in the coordinate system. A displacement vector is defined as a vector that corresponds to this movement from the previous location to the new location. A displacement 522 can be defined as the distance of the movement $d=|c'-c|$, where "d" is the distance, "c" is the centroid 520, and "c'" is the displaced centroid 520'. The displacement 522 is illustrated in FIG. 5 as the dashed circle having the centroid 520 at its center and having a radius equal to the movement distance.

Geometric reasoning generates a lower bound 530 on the displacement 522 of the centroid 520 relative to the media vector 510. The previous distance 512 between the media vector 510 and the centroid 520 (from the previous location and not the displaced location; this distance is $|x-c|$, where "x" is the media vector 510) is known from the previous iteration and need not be computed again. The lower bound 530 can be efficiently and quickly computed (e.g., without additional distance computations) as $LB=|x-c|-|c'-c|$, where "LB" is the lower bound. FIG. 5 illustrates the lower bound 530 as the dashed circle having the media vector 510 at its center and having a radius equal to $|x-c|-|c'-c|$.

Geometric reasoning also generates an upper bound 540 on the displacement 522 of the centroid 520 relative to the media vector 510. The upper bound 540 can be efficiently and quickly computed (e.g., without additional distance computations) as $UB=|x-c+c'-c|$, where "UB" is the upper bound. FIG. 5 illustrates the upper bound 540 as the dashed circle having the media vector 510 at its center and having a radius equal to $|x-c|+|c'-c|$.

Computed lower and upper bounds can be used to determine whether distance computations between media vectors and the displaced centroids in the current iteration are needed or not. For example, geometric reasoning implements a rule to determine how certain conditions are met given these bounds. In an example and referring back to the media vector 510, the rule specifies that if the upper bound 540 is smaller than the lower bounds of other centroids, the distance computations between the input vector 510 and the remaining centroids can be skipped. That is because, in the current iteration, the displaced centroid 520' remains the closest centroid in distance to the media vector 510. In this case, the media vector 510 can remain in the first cluster and need not be re-assigned to another cluster. This retention of the media vector 510 in the first cluster is accomplished without computing and comparing the distances between the media vector 510 the displaced centroid 520' and between the media vector 510 and each of the other displaced centroids. On the other hand, if the upper bound 540 is greater than one or more of the lower bounds of the other centroids, the rules indicate that the relevant distances should be computed and compared. A distance is between the media vector 510 and a displaced centroid of another cluster. This distance is relevant (and should be computed) if the upper bound 540 is smaller than the lower bound relative the displaced centroid of the other cluster.

Figure 6:
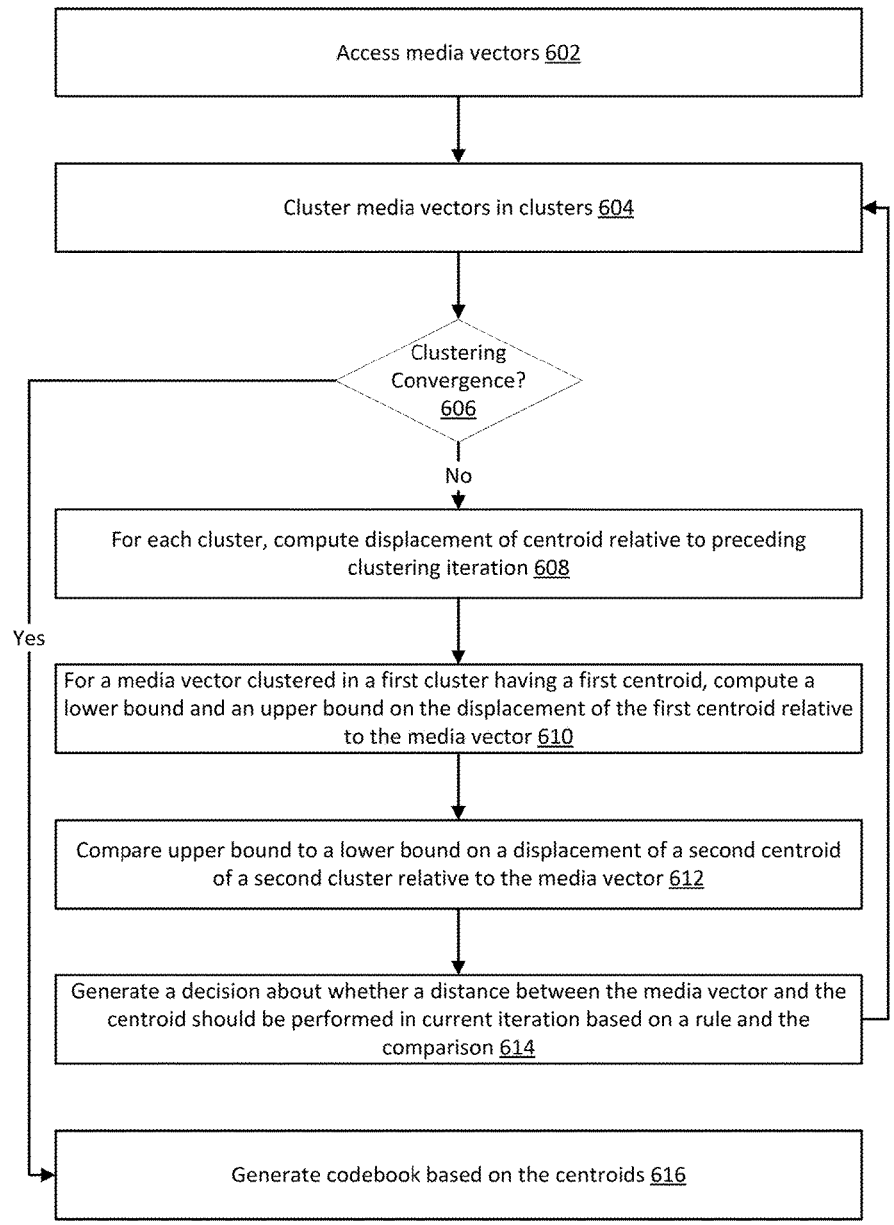
FIG. 6 illustrates an example of a flow for generating a codebook based on iterative clustering that uses geometric reasoning according to embodiments of the present disclosure.

FIG. 6 illustrates an example of a flow for generating a codebook based on iterative clustering that uses geometric reasoning according to embodiments of the present disclosure. A computer system, such as the one described in connection with FIG. 4, may be configured to perform the illustrative flow as a set of sub-operations of operation 404 of FIG. 4. Some of the operations between the two flows may be similar. Such similarities are not repeated herein in the interest of clarity.

Instructions for performing the operations of the illustrative flow can be stored as computer-readable instructions on a non-transitory computer-readable medium of the computer system. As stored, the instructions represent programmable modules that include code or data executable by a processor of the computer system. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

The example flow of FIG. 6 starts at operation 602, where the computer system accesses media vectors. At operation 604, the computer system clusters the media vectors in clusters. In an example, iterative clustering, such as K-Means clustering is used. Hence, in at least the initial iteration, the media vectors are assigned across the various "K" clusters, where this distribution computes the distances between the media vectors and the centroids of these clusters.

At operation 606, the computer system determines whether the iterative clustering has converged. Generally, convergence cannot occur until after a number "N" of iterations (where "N" is an integer equal to or greater than two). In an example, the K-Means algorithm converges when the assignments in a current clustering iteration do not change relative to the preceding iteration (or the change, such as the number of re-assignments, is within an acceptable range), or the number of iterations reached a predefined maximum number. If convergence occurs, operation 616 follows operation 606, where the codebook is generated as further described herein below. Otherwise, operation 608 follows operation 606. Generally, operation 608 through operation 610 are performed between iterations: after the update step in the K-Means algorithm from the preceding clustering iteration, but before the assignment step in the K-Means algorithm in the current clustering iteration.

At operation 608, the computer system computes, for each cluster (or, equivalently, centroid) the displacement of the centroid of the cluster relative to the preceding clustering iteration. As described in connection with FIG. 5, this computation is a distance computation between the preceding location of the centroid (its location in a coordinate system according to the preceding clustering iteration) and the current location of the centroid (its location in the coordinate system according to the current clustering iteration).

At operation 610, the computer system computes, for a media vector clustered in a first cluster, an upper bound and, optionally, a lower bound on the displacement of a first centroid relative to the media vector. The first centroid is the mean of the first cluster. As described in connection with FIG. 5, the lower bound is equal to the distance between the media vector and the un-displaced first centroid (e.g., to its preceding location) minus the displacement of the first centroid. Similarly, the upper bound is equal to the distance between the media vector and the un-displaced first centroid plus the displacement of the first centroid. These distances need not be computed again in the current iteration as it may be available from the preceding clustering iteration. Hence, the computations of the lower and upper bounds can be quick and efficient (relative to performing the distance computation in the current clustering iteration). The computer system can also compute the lower and upper bounds on the displacements of other centroids relative to the media vectors. Similarly, the computer system can repeat the lower and upper bound computations across the different media vectors.

At operation 612, the computer system compares the upper bound on the displacement of the first centroid relative to the media vector to a lower bound on a displacement of a second centroid relative to the media vector (and, similarly, to the relevant upper bounds of all other centroids). The second centroid is the mean of a second cluster. The comparison of the bounds allows the computer system to determine whether the computations of the distance between the media vector and first second centroid and the distance between the media vector and the second centroid are needed in the current clustering iteration (given that these two centroids have been displaced) or not. This determination supports assessing a membership of the media vector in the first cluster or the second cluster. The membership indicates if the media vector remains in the first cluster or should be moved to the second cluster (or other clusters). If the distance computation is not needed, the media vector should not be re-assigned to the second cluster. Hence, the media vector should not be a member of the second cluster. If the distance computation is needed, the media vector can potentially be re-assigned to the second cluster (or re-assigned to a more relevant cluster, or retained in the first cluster). Hence, whether the membership of the media vector remains with the first cluster or moves to the second cluster or to some other cluster depends on similar determinations (based on the comparison of bounds) and, potential, distance computations for other centroids.

Operation 614 generates, based on a rule and the comparison of operation 612, a decision about whether the distance computation between the media vector and the first centroid and the distance computation between the media vector and the second centroid (and similarly for other centroids) are needed in the current clustering iteration. In an example, the rule specifies that the distance computations should be skipped when the upper bound on the displacement of the first centroid is smaller than the lower bound on the displacement of the second centroid. In this case, the media vector should not be re-assigned to the second cluster and, thus, the membership of the media vector does not change from the first cluster to the second cluster. On the other hand, if the upper bound on the displacement of the first centroid is greater than the lower bound on the displacement of the second centroid, the rule specifies that a first distance between the media vector and the displaced first centroid (its current location according to the current clustering iteration) and a second distance between the media vector and the displaced second centroid (its current location according to the current clustering iteration) should be computed and compared. If this comparison indicates that the first distance is smaller than the second distance, the rule specifies that the media vector should remain in the first cluster. Otherwise, the rule specifies that the media vector should be re-assigned to the second cluster.

In some embodiments, even if such distances should be computed according to the rule, the actual computations of these distances can be skipped to further reduce the latency of generating the codebook. Instead, the computer system can use KD-Tree search and/or locality-sensitive hashing. Further description of using the locality-sensitive hashing to avoid the distance computations is further described in the next figures.

Once the decision is generated, the computer system performs this decision (e.g., skips the distance computation and re-assignment to the second cluster, computes the first and second distances and potentially re-assigns the media vector to the second cluster). The decision is performed at operation 604 (e.g., the computer system loops back from operation 614 to operation 604). The computer system can also generate and perform similar decisions by repeating the lower-to-upper bounds comparison for the media vector and across the different centroids. Similarly, the computer system can generate and perform equivalent decisions for the various media vectors.

At operation 616, the computer system generates the codebook based on the centroids. At this operation, the iterative clustering has converged. The computer system sets each centroid as a codebook vector in the codebook.

FIG. 7 illustrates an example of locality-sensitive hashing for encoding media vectors according to embodiments of the present disclosure. Generally, locality-sensitive hashing reduces the dimensionality of high-dimensional data. Locality-sensitive hashing hashes vectors so that similar vectors map to the same "buckets" with high probability (the number of buckets being much smaller than the universe of possible vectors). Locality-sensitive hashing differs from conventional and cryptographic hash functions because it aims to maximize the probability of a "collision" for similar vectors. Similarity between vectors can be expressed as the distance proximity between two vectors. The smaller the distance between two vectors, the larger the proximity between the two vectors are, and the more similar the two vectors are.

Locality-sensitive hashing creates a hash for every vector, where if two vectors ("p" and "q," each having "N" elements) are similar (e.g., distance between the two is smaller than some threshold), the two vectors are hashed to a same hash (e.g. h(p)=h(q) where, "h" is the hash function). The hash is a value and represents a bucket to which the two vectors are mapped or grouped. Locality-sensitive hashing can apply a suite of hash functions ($h_1, \ldots, h_L$) to each vector or can apply a simple hash function (h) such as one that computes the Hamming distance of the vector.

In the context of vector quantization, the similarity between two vectors is performed in two steps of the compression process. First, it is performed in the iterative clustering as part of generating the codebook. In particular, the similarity between a media vector and a centroid is assessed. The similarity is computed as the distance between these two vectors. The media vector is assigned to the cluster of the centroid if the two vectors are likely the most similar (relative to the similarities of the media vector to other centroids). Second, in the encoding, the similarity between a media vector and a codebook vector is assessed. This similarity is computed also as the distance between these two vectors. The media vector is matched with the codebook vector if the two vectors are likely the most similar (relative to the similarities of the media vector to other codebook vectors).

The distance computation used to assess a similarity between two vectors can be complex and time consuming. Instead, locality sensitive hashes can be used (in addition to or in the alternative of a KD-Tree search). Generally, two vectors having the most similar hashes are the most similar vectors. The similarity here can be the difference in the values of the hashes, rather than a distance computation. In the context of iterative clustering to generate the codebook, the similarity between a media vector and a centroid can be assessed by comparing the hash of the media vector and the hash of the centroid. The media vector is assigned to the cluster of the centroid if the difference between the two hashes is the smallest relative to the differences of the hash of the media vector and the hashes of the other centroids. In the context of encoding, the similarity between a media vector and a codebook vector can be assessed by comparing the hash of the media vector and the hash of the codebook vector. The media vector is matched with the codebook vector if the difference between the two hashes is the smallest relative to the differences of the hash of the media vector and the hashes of the codebook vectors.

As illustrated in FIG. 7, a first media vector 710 is mapped to a first bucket 720 by applying locality-sensitive hashing 730 to the first media vector 710. The locality-sensitive hashing 730 applies a hash function to the first media vector 710 and generates a hash. The first bucket 720 is associated with that same hash.

A second media vector 750 is similar to the first media vector 710 (e.g., the distance between the two vectors 710 and 750 is smaller than a threshold). Because of the similarities between the two vectors 710 and 750, the locality-sensitive hashing 730 generates the same hash for the second media vector 750 and maps the second media vector 750 to the same first bucket 720.

A third media vector 770 is relatively less similar to the first media vector 710 (e.g., the distance between the two vectors 710 and 770 is greater than the threshold or than the distance between the first and second vectors 710 and 750). Because of the dissimilarities between the two vectors 710 and 770, the locality-sensitive hashing 730 generates a different hash for the third media vector 770 and maps the third media vector 770 the a different bucket 780.

The locality-sensitive hashing 730 can be applied to the various media vectors such that the media vectors are mapped to buckets. The total number of buckets is much smaller than the total number of media vectors. Nonetheless, because similarities between the media vectors are observed given that locality-sensitive hashing is used (as opposed to general hashing), each bucket is associated with similar media vectors.

In some embodiments, locality-sensitive hashing can also be applied to centroids and to codebook vectors to map them to buckets and reduce the universe of possible values. In other embodiments, locality-sensitive hashing is not applied to centroids and to codebook vectors. In such examples, the hash of a centroid or a codebook vector is generated by applying general hashing thereto. Nonetheless, the general hashing applies the same hashing function used in the locality-sensitive hashing applied to media vectors. By using the same hashing function, the assessing the similarity between a media vector and a centroid is possible based on a comparison of the hash of the media vector and the hash of the centroid. The same holds true for assessing the similarity between a media vector and a codebook vector.

FIG. 8 illustrates an example of a flow for encoding media vectors based on locality-sensitive hashing according to embodiments of the present disclosure. A computer system, such as the one described in connection with FIG. 4, may be configured to perform the illustrative flow as a set of sub-operations of operation 408 of FIG. 4. Some of the operations between the two flows may be similar. Such similarities are not repeated herein in the interest of clarity.

Instructions for performing the operations of the illustrative flow can be stored as computer-readable instructions on a non-transitory computer-readable medium of the computer system. As stored, the instructions represent programmable modules that include code or data executable by a processor of the computer system. The execution of such instructions configures the computer system to perform the specific operations shown in the figures and described herein. Each programmable module in combination with the processor represent a means for performing a respective operation(s). While the operations are illustrated in a particular order, it should be understood that no particular order is necessary and that one or more operations may be omitted, skipped, and/or reordered.

The example flow of FIG. 8 starts at operation 802, where the computer system generates a hash for each codebook vector in a codebook. The hash can be generated by applying a hash function to each of the codebook vectors. The hashes can be added in the codebook or maintained separately. If maintained separately, the computer system also maintains a map between the hashes and the codebook vectors. For example, this mapping can use the codebook indices to associate the hashes with the codebook vectors.

At operation 804, the computer system accesses media vectors. At operation 806, the computer system generates, for each media vector, a hash based on locality-sensitive hashing. For example, the computer system applies locality-sensitive hashing to each media vector. The locality-sensitive hashing uses the same hash function of operation 802, but maximizes the probability of a "collision" for similar vectors. Hence, a hash of a first media vector is common to a second media vector of the media vectors (e.g., the two media vectors have the same hash) based on distance proximity between the first media vector and the second media vector (e.g., the distance between the two vectors is smaller than a threshold, indicating that the two vectors are similar).

At operation 808, the computer system compares the hash of a media vector to the hashes of the codebook vectors. The comparisons allow the computer system to match the media vector with a particular codebook vector by matching their hashes. In an example, the best match is used, where the hash of the media vector matches the hash of a codebook vector if the difference between the two hashes is the smallest among the differences between the hash of the media vector and the hashes of the codebook vectors. The computer system may repeat the comparison for the other media vectors such that each media vector is matched with one of the codebook vectors.

At operation 810, the computer system identifies an index in the codebook based on the comparison. For example, the computer system identifies that the media vector should be represented by the matched codebook vector. Accordingly, the computer system retrieves the index of that codebook vector from the codebook. The computer system may repeat the identification for the other media vectors such that a codebook index is identified for each media vector.

At operation 812, the computer system encodes the media vectors. In an example, the encoding includes at least representing the media vectors with the indexes and storing the indexes in data storage in lieu of the media vectors.

Figure 9:
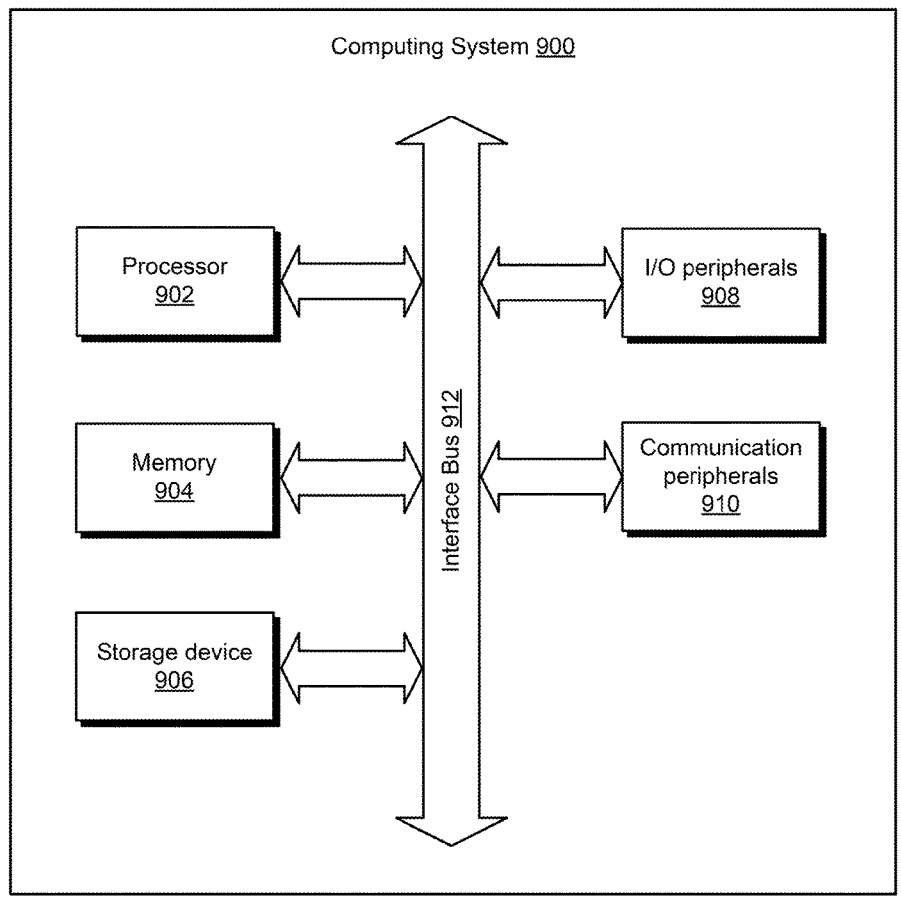
FIG. 9 illustrates examples of components of a computer system 900, according to certain embodiments.

FIG. 9 illustrates examples of components of a computer system 900, according to certain embodiments. The computer system 900 is an example of the computers systems described in connection with FIGS. 1-8. Although these components are illustrated as belonging to a same computer system 900, the computer system 900 can also be distributed.

The computer system 900 includes at least a processor 902, a memory 904, a storage device 906, input/output peripherals (I/O) 908, communication peripherals 910, and an interface bus 912. The interface bus 912 is configured to communicate, transmit, and transfer data, controls, and commands among the various components of the computer system 900. The memory 904 and the storage device 906 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 904 and the storage device 906 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computer system 900.

Further, the memory 904 includes an operating system, programs, and applications. The processor 902 is configured to execute the stored instructions and includes, for example, a logical processing unit, a microprocessor, a digital signal processor, and other processors. The memory 904 and/or the processor 902 can be virtualized and can be hosted within another computing system of, for example, a cloud network or a data center. The I/O peripherals 908 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 908 are connected to the processor 902 through any of the ports coupled to the interface bus 912. The communication peripherals 910 are configured to facilitate communication between the computer system 900 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms, such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A computer-implemented method for vector-quantization compression, the computer-implemented comprising:

clustering, by a computer system and in a first clustering iteration, media vectors in a set of clusters based on distances between the media vectors and centroids that represent the clusters, wherein a media vector is clustered in a first cluster represented by a first centroid;

performing, by the computer system and in a second clustering iteration, operations comprising:

computing a first displacement of the first centroid between the first clustering iteration and the second clustering iteration, and determining, based on a rule, a membership of the media vector in the first cluster or a second cluster, wherein the rule specifies whether the media vector should remain in the first cluster based on a bound on the first displacement of the first centroid relative to the media vector; and generating, by the computer system and based on the iterative clustering of the media vectors in the set of clusters, a codebook that comprises codebook vectors with a first codebook vector corresponding to the first centroid, wherein:

the codebook is available for use in encoding and decoding of the media vectors, the first codebook vector is usable for encoding and decoding the media vector based on the membership of the media vector being in the first cluster.

2. The computer-implemented method of claim 1, further comprising encoding of the media vectors by performing operations comprising:

generating, by the computer system, a hash for a first media vector of the media vectors based on locality-sensitive hashing, wherein the hash is common to a second media vector of the media vectors based on distance proximity between the first media vector and the second media vector;

identifying, by the computer system for the first media vector, an index of a codebook vector from the codebook based on a comparison of the hash to hashes of the codebook vectors; and encoding, by the computer system, the first media vector by at least representing the first media vector with the index and storing the index in data storage in lieu of storing the first media vector in the data storage.

3. The computer-implemented method of claim 1, further comprising the decoding of the media vectors by performing operations comprising:

accessing, by the computer system, an index of the media vector from data storage, wherein the index is stored in the data storage in lieu of storing the media vector;

identifying, by the computer system, a codebook vector from the codebook based on the index; and decoding, by the computer system, the media vector based on the codebook vector.

4. The computer-implemented method of claim 1, wherein the media vector comprises a moving picture experts group (MPEG) standard compliant vector across multiple broadcast media channels, wherein the MPEG standard compliant vector is associated with a media stream on one of the broadcast media channels and is encoded to a storage location on a computing cloud in response to a digital video recorder (DVR) request from a computing device to store the media stream.

5. The computer-implemented method of claim 1, wherein the bound is an upper bound on the first displacement of the first centroid relative to the media vector, wherein the operations further comprise comparing the upper bound to a lower bound on a second displacement of a second centroid of the second cluster relative to the media vector, and wherein the rule specifies that the media vector should remain in the first cluster if the upper bound is smaller than the lower bound.

6. The computer-implemented method of claim 5, wherein the rule further specifies that when the upper bound is smaller than the lower bound, computation of (i) a first distance between the media vector and a first displaced location of the first centroid and (ii) a second distance between the media vector and a second displaced location of the second centroid should be skipped in the second clustering iteration.

7. The computer-implemented method of claim 6, wherein the rule further specifies that when the upper bound is greater than the lower bound, the computation of the first distance and the second distance should be performed and used in a decision to re-assign the membership of the media vector from the first cluster to the second cluster.

8. The computer-implemented method of claim 7, wherein the media vector remains in the first cluster if the first distance is smaller than the second distance, and wherein the media vector moves to the second cluster if the first distance is greater than the second distance.

9. The computer-implemented method of claim 5, wherein the rule further specifies that if the upper bound is smaller than the lower bound, a hash of the media vector should be computed based on locality-sensitive hashing and compared to a first hash of the first centroid and to a second hash of the second centroid, and wherein the determination of the membership is based on comparisons of the hash to the first hash and to the second hash.

10. The computer-implemented method of claim 5, wherein the upper bound is computed as a distance between the media vector and a previous location of the first centroid in the first clustering iteration plus the first displacement of the first centroid in the second clustering iteration.

11. A system for vector-quantization compression, the system comprising:

means for accessing media vectors that are associated with media data;

means for generating a hash for a first media vector of the media vectors based on locality-sensitive hashing, wherein the hash is common to a second media vector of the media vectors based on distance proximity between the first media vector and the second media vector;

means for identifying, for the first media vector and from a codebook that comprises codebook vectors, an index of a codebook vector based on a comparison of the hash to hashes of the codebook vectors; and means for encoding the first media vector by at least representing the first media vector with the index and storing the index in a data storage in lieu of storing the first media vector in the data storage.

12. The system of claim 11, further comprising means for generating the codebook based on iterative clustering of the media vectors in clusters, wherein each codebook vector corresponds to a centroid of a cluster, wherein the iterative clustering comprises:

computing a displacement of a first centroid of a first cluster between successive clustering iterations, and determining, based on a rule, a membership of the first media vector in the first cluster or a second cluster, wherein the rule specifies whether the first media vector should remain in the first cluster based on a bound on the first displacement of the first centroid relative to the media vector.

13. The system of claim 12, wherein the bound is an upper bound on the first displacement of the first centroid relative to the media vector, and wherein the iterative clustering further comprises comparing the upper bound to a lower bound on a displacement of a second centroid of the second cluster relative to the first media vector, and wherein the rule specifies that the first media vector should remain in the first cluster if the upper bound is smaller than the lower bound.

14. The system of claim 11, wherein the hashes of the codebook vectors are also generated based on locality-sensitive hashing, and further comprising means of decoding the first media vector by:

accessing the index of the first media vector from the data storage;

identifying, the codebook vector from the codebook based on the index; and decoding the first media vector based on the codebook vector.

15. The system of claim 11, further comprising means for mapping the media vectors to buckets based on hashes of the media vectors, wherein the hashes of the media vectors are generated based on locality-sensitive hashes, wherein each of the buckets is associated with one of the hashes of the media vectors, and wherein a total number of the buckets is smaller than a total number of the media vectors.

16. A non-transitory computer-readable storage medium comprising computer-readable instructions for vector-quantization compression, the computer-readable instructions upon execution on a computer system cause the computer system to perform operations comprising:

generating a codebook that comprises codebook vectors based on iterative clustering of media vectors in clusters, wherein each codebook vector corresponds to a centroid of a cluster, wherein the iterative clustering comprises:

computing a displacement of a first centroid of a first cluster between successive clustering iterations, a first media vector being assigned to the first cluster, and determining, based on a rule, a membership of the first media vector in the first cluster or a second cluster, wherein the rule specifies whether the first media vector should remain in the first cluster based on a bound on the first displacement of the first centroid relative to the media vector;

generating a hash for the first media vector based on locality-sensitive hashing, wherein the hash is common to a second media vector of the media vectors based on distance proximity between the first media vector and the second media vector;

identifying, for the first media vector and from the codebook, an index of a codebook vector based on a comparison of the hash to hashes of the codebook vectors; and encoding the first media vector by at least representing the first media vector with the index and storing the index in a data storage in lieu of storing the first media vector in the data storage.

17. The non-transitory computer-readable storage medium of claim 16, wherein the first media vector is available from a media stream and is encoded based on a request from a computing device to record the media stream, and wherein the operations further comprise:

accessing the index of the first media vector from the data storage based on a request from a computing device to play the media stream;

identifying, the codebook vector from the codebook based on the index;

decoding the first media vector based on the codebook vector; and transmitting the first media vector to the computing device.

18. The non-transitory computer-readable storage medium of claim 16, wherein the bound is an upper bound on the displacement of the first centroid relative to the first media vector, wherein the rule further specifies that, if the upper bound is greater than a lower bound on a displacement of a second centroid of the second cluster relative to the first media vector, a distance between the first media vector and a displaced location of the first centroid should be computed in a current clustering iteration, and wherein the membership of the first media vector in the first cluster or the second cluster is based on the distance.

19. The non-transitory computer-readable storage medium of claim 16, wherein the bound is an upper bound on the displacement of the first centroid relative to the first media vector, wherein the rule further specifies that if the upper bound is greater than a lower bound on a displacement of a second centroid of the second cluster relative to the first media vector, the hash of the first media vector should compared to a first hash of the first centroid and to a second hash of the second centroid, and wherein the membership of the first media vector in the first cluster or the second cluster is based on comparisons of the hash to the first hash and to the second hash.

20. The non-transitory computer-readable storage medium of claim 19, wherein the hashes of the codebook vectors and the hash of the first media vector are generated during the successive clustering iterations.

* * * * *